(12) United States Patent
Watanabe et al.

(10) Patent No.: US 11,932,025 B2
(45) Date of Patent: Mar. 19, 2024

(54) RECORDING METHOD AND INK JET RECORDING APPARATUS

(71) Applicant: Seiko Epson Corporation, Tokyo (JP)

(72) Inventors: Tadashi Watanabe, Shiojiri (JP); Ippei Okuda, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 161 days.

(21) Appl. No.: 17/560,335

(22) Filed: Dec. 23, 2021

(65) Prior Publication Data

US 2022/0203698 A1 Jun. 30, 2022

(30) Foreign Application Priority Data

Dec. 25, 2020 (JP) ................. 2020-216431

(51) Int. Cl.
*B41J 2/21* (2006.01)
*B41J 2/01* (2006.01)
*C09D 11/322* (2014.01)

(52) U.S. Cl.
CPC .............. *B41J 2/2114* (2013.01); *B41J 2/01* (2013.01); *B41J 2/2107* (2013.01); *B41J 2/2117* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538;

(Continued)

(56) References Cited

U.S. PATENT DOCUMENTS

2003/0142168 A1* 7/2003 Suzuki ................ B65B 61/025
347/43
2004/0189772 A1* 9/2004 Arai ................... B41J 11/00212
347/102

(Continued)

FOREIGN PATENT DOCUMENTS

JP 2010-158884 A 7/2010

*Primary Examiner* — Manish S Shah
(74) *Attorney, Agent, or Firm* — Harness, Dickey & Pierce, P.L.C.

(57) ABSTRACT

A recording method for performing recording on a recording medium includes a processing liquid attaching step of attaching a processing liquid including an aggregating agent to the recording medium, a white ink attaching step of attaching a white ink composition including a white coloring material to the recording medium, and a non-white ink attaching step of attaching a non-white ink composition including a non-white coloring material to the recording medium, in which attachment of the white ink composition and attachment of the non-white ink composition are performed by relative scanning of a recording head and the (Continued)

recording medium, and attachment of the white ink composition and attachment of the non-white ink composition are performed on a scanning region of the recording medium by a relative scanning.

12 Claims, 3 Drawing Sheets

(58) Field of Classification Search
CPC .............. B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 2004/0201660 A1* | 10/2004 | Nishikawa | B41J 2/2114 347/100 |
| 2005/0179725 A1* | 8/2005 | Matsushima | B41J 2/2117 347/40 |
| 2010/0143593 A1 | 6/2010 | Sano | |
| 2011/0109673 A1* | 5/2011 | Usuda | B41J 29/393 347/9 |
| 2011/0205290 A1* | 8/2011 | Tojo | C09D 11/322 347/21 |
| 2011/0221805 A1* | 9/2011 | Yoshida | B41J 2/2107 427/265 |
| 2011/0234680 A1* | 9/2011 | Aoyama | C09D 11/40 522/64 |
| 2015/0091974 A1* | 4/2015 | Aoyama | B41M 5/0011 347/21 |
| 2015/0274992 A1* | 10/2015 | Aoyama | C09D 11/38 347/21 |
| 2016/0129702 A1* | 5/2016 | Katagami | B41J 11/00222 347/102 |
| 2017/0247561 A1* | 8/2017 | Nakagawa | B41J 11/0015 |
| 2019/0284427 A1* | 9/2019 | Matsuzaki | B41J 2/21 |
| 2020/0131394 A1* | 4/2020 | Fujii | B41M 5/0011 |
| 2020/0276827 A1* | 9/2020 | Ishida | B41M 5/0017 |

* cited by examiner

RECORDING METHOD AND INK JET RECORDING APPARATUS

The present application is based on, and claims priority from JP Application Serial Number 2020-216431, filed Dec. 25, 2020, the disclosure of which is hereby incorporated by reference herein in its entirety.

BACKGROUND

1. Technical Field

The present disclosure relates to a recording method and an ink jet recording apparatus.

2. Related Art

In industrial and commercial applications, various types of printing are performed on colored or transparent media. As printing applications, there are, for example, soft packaging printing, label printing, signage printing, textile printing, cardboard printing, and the like, and there is a demand for images with excellent visibility.

For example, JP-A-2010-158884 discloses an ink jet recording method in which a white ink is attached and then a color ink is attached on top of the white ink. The document describes that, in this method, the white image is the background image and it is possible to record color images with high visibility.

However, for example, when recording is performed on a non-white recording medium, the visibility of the color ink image is insufficient. In addition, the filling in of the color ink image is insufficient.

SUMMARY

According to an aspect of the present disclosure, provided is a recording method for performing recording on a recording medium, the method including a processing liquid attaching step of attaching a processing liquid including an aggregating agent to the recording medium, a white ink attaching step of attaching a white ink composition including a white coloring material to the recording medium, and a non-white ink attaching step of attaching a non-white ink composition including a non-white coloring material to the recording medium, in which attachment of the white ink composition and attachment of the non-white ink composition are performed by relative scanning of a recording head and the recording medium, and attachment of the white ink composition and attachment of the non-white ink composition are performed on a scanning region of the recording medium by a relative scanning.

According to an aspect of the present disclosure, provided is a recording apparatus for performing recording on a recording medium, the apparatus including a processing liquid attaching mechanism for attaching a processing liquid including an aggregating agent to the recording medium, a white ink head for attaching a white ink composition including a white coloring material to the recording medium, a non-white ink head for attaching a non-white ink composition including a non-white coloring material to the recording medium, and a scanning mechanism for performing relative scanning between the white ink head and the recording medium and between the non-white ink head and the recording medium, in which recording is performed using the recording method described above.

DESCRIPTION OF EXEMPLARY EMBODIMENTS

A detailed description will be given below of an embodiment of the present disclosure (referred to below as "the present embodiment") with reference to the drawings as necessary; however, the present disclosure is not limited thereto and various modifications are possible in a range not departing from the gist thereof. In the drawings, the same reference numerals are attached to the same elements and overlapping explanations will not be repeated. In addition, the positional relationships such as up, down, left, right, and the like are based on the positional relationships shown in the drawings, unless otherwise noted. Furthermore, the dimensional proportions in the figures are not limited to the proportions shown in the drawings.

1. Recording Method

The recording method of the present embodiment is a recording method for performing recording on a recording medium, the method including a processing liquid attaching step of attaching a processing liquid including an aggregating agent to the recording medium, a white ink attaching step of attaching a white ink composition including a white coloring material to the recording medium, and a non-white ink attaching step of attaching a non-white ink composition including a non-white coloring material to the recording medium, in which the attachment of the white ink composition and the attachment of the non-white ink composition are performed by relative scanning of a recording head and the recording medium, and the attachment of the white ink composition and the attachment of the non-white ink composition are performed on a scanning region of the recording medium by a relative scanning.

In the related art, a white ink layer and a non-white ink layer are so as to overlap each other and the white ink layer is used as a concealing layer to record a high-quality image.

In contrast, in the present embodiment, the attachment of the white ink composition and the attachment of the non-white ink composition are performed on a scanning region of the recording medium by a relative scanning. Due to this, it is possible to form a single ink layer including a white ink composition and a non-white ink composition on the recording medium and it has been found that an image with excellent color developing property without shading unevenness or the like is formed without forming a white ink layer and a non-white ink layer so as to overlap each other as in the related art.

In particular, when the attachment of the white ink composition and the attachment of the non-white ink composition are performed on a scanning region of the recording medium by a relative scanning, the droplets of each of these ink compositions mix on the recording medium, which easily generates shading unevenness or the like; however, by using a processing liquid, it is possible to suppress shading unevenness and to form images with excellent color developing property.

In addition, from another point of view, in the method of the related art where a white ink layer and a non-white ink layer are so as to overlap each other using a processing liquid, the processing liquid is consumed by the ink composition to be attached first among the white ink composition and the non-white ink composition, or the processing liquid is absorbed by the recording medium. Therefore, the processing liquid does not sufficiently act on the ink composition to be attached later, which may lead to a decrease in the color developing property of the ink or the like.

In contrast, in the recording method of the present embodiment, the attachment of the white ink composition and the attachment of the non-white ink composition are performed on a scanning region of the recording medium by a relative scanning, which makes it possible for the processing liquid to act on both the white ink composition and the non-white ink composition and to solve the problems due to the order of the attachment as in the related art.

In addition, in the present embodiment, since it is not necessary to overlap and form the white ink layer and the non-white ink layer, it is also possible to further improve the printing speed.

Furthermore, it is possible to set a head configuration in which nozzles ejecting the white ink composition and nozzles ejecting the non-white ink composition are arranged side by side so that the attachment of the white ink composition and the attachment of the non-white ink composition are performed on a scanning region of the recording medium by a relative scanning. Therefore, it is also possible to reduce the overall size of the ink jet head compared to head configurations in the related art premised on lamination.

1.1. Attachment of White Ink Composition and Non-White Ink Composition

Below, before explaining each step, a description will be given of the manner of attachment of the white ink composition and the non-white ink composition in the present embodiment. In the recording method of the present embodiment, the attachment of the white ink composition and the attachment of the non-white ink composition is performed by relative scanning of the recording head and the recording medium, and the attachment of the white ink composition and the attachment of the non-white ink composition is performed on a scanning region of the recording medium by a relative scanning.

Here, a relative scanning means, for example, in a case of a serial-type ink jet recording apparatus, a single scan in which the recording head moves in relation to a main scanning direction intersecting a transport direction of the recording medium, and in a case of a line-type ink jet recording apparatus, means a single scan in which the recording head of the same length as the width of the recording medium moves in relation to the transport direction of the recording medium.

As long as the scanning is relative scanning, the scanning may be performed by the recording head moving with respect to the recording medium or the scanning may be performed by the recording medium moving with respect to the recording head. The scanning is performed while ejecting ink from the recording head to the recording medium.

For example, in a serial-type ink jet recording apparatus, when a plurality of scans are performed with the recording head reciprocating over the same region of the recording medium in the main scanning direction, one of the outward or backward scans is set as a single scan. Accordingly, the white ink attaching step and the non-white ink attaching step being performed by a relative scanning means that both steps are performed during one scan of the recording head.

In addition, performing the attachment of each ink composition with respect to a scanning region of the recording medium means performing the attachment of the white ink composition and the attachment of the non-white ink composition to the region passed over by the above scanning. Due to this, it is possible to form a single ink layer including the white ink composition and the non-white ink composition on the recording medium.

The recording head for white ink and the recording head for non-white ink perform scanning at the same time. In this scanning (same scanning), the attachment of the white ink composition and the attachment of the non-white ink composition are performed on a scanning region. The scanning region in the scanning is the region of the recording medium in which scanning is performed by the recording head in the scanning. With a serial-type ink jet recording apparatus, the scanning region is the portion on the recording medium where the recording head moves with respect to the recording medium in the scanning.

Performing the attachment of white ink and the attachment of non-white ink with respect to a scanning region of the recording medium by a relative scanning means that the scanning region by the recording head for white ink and the scanning region by the recording head for non-white ink have the same region (overlapping region) in the same scanning. It is sufficient to have at least a part of the same region.

It is possible to perform the recording method of the present embodiment by either the serial-type or the line-type method, but it is preferable to perform the recording method by the serial-type method in which each of the white ink composition and the non-white ink composition is attached to the scanning region by scanning two or more times. when a white ink layer and a non-white ink layer are so as to overlap each other by the serial-type method as in the related art, scanning is performed in which one ink is attached first, followed by scanning in which the other ink is attached. In contrast, in the present embodiment, since the white ink composition and the non-white ink composition are attached by a relative scanning, it is possible to halve the number of scans necessary for image formation and to double the printing speed.

In particular, the above relates to the number of scans with respect to a scanning region. For example, there are cases where two or more scans are performed on a scanning region. For example, in the example of FIG. 2, when the length of one sub-scan in the sub-scanning direction is one quarter of the length of a nozzle row N1 in the sub-scanning direction, four scans are performed on a rectangular scanning region which is one sub-scan long in the sub-scanning direction and which extends in the main scanning direction. The number of scans when viewed in this manner is called the number of scans, the number of passes, or the like. The number of scans is one or more, two or more is preferable, three or more is more preferable, four or more is even more preferable, and eight or more is particularly preferable. The upper limit is not limited, but 24 or less is preferable, and 12 or less is more preferable. The greater the number of scans, the greater the number of times the ink is able to be attached to the rectangular region described above and the better the image quality, which is preferable.

The white ink composition and the non-white ink composition used in the present embodiment may be either solvent-based inks or water-based inks, but are preferably water-based inks. In comparison with solvent-based inks, water-based inks have higher environmental friendliness in terms of not using organic solvents or the content thereof being low. In addition to the above, when the white ink composition and the non-white ink composition are water-based inks, the white ink composition and the non-white ink composition easily mix and tend to cause a decrease in the color developing property and the generation of shading unevenness, and, in particular, there is a tendency for the images obtained therewith to be whitish. Therefore, the present disclosure is particularly useful. The term water-based in the context of "water-based" inks and processing liquids refers to water being included at least as a major solvent component. The water content included in the ink or the like is 40% by mass or more, and preferably 50% by mass or more.

1.2. Processing Liquid Attaching Step

The processing liquid attaching step is a step of attaching a processing liquid including an aggregating agent to a recording medium. At this time, from the viewpoint of aggregating the components of the ink composition, at least a part of the attachment region of the processing liquid and the attachment region of the white ink composition or non-white ink composition is set to overlap.

Due to the aggregating agent in the processing liquid interacting with the components of the white ink composition and the non-white ink composition, the ink composition becomes thickened or insoluble. Due to this, shading unevenness of the image formed by the white ink composition and non-white ink composition to be attached thereafter is further suppressed and the color developing property is further improved. Furthermore, it is also possible to improve the recording speed and to improve the abrasion resistance of the obtained recorded material.

Examples of methods for attaching the processing liquid to the recording medium include a method for carrying out attachment using an ink jet method as well as coating methods using a bar coater, a roll coater, a spray, or the like.

1.2.1. Processing Liquid

The processing liquid includes an aggregating agent and may include water, water-soluble organic solvents, and surfactants, as necessary.

1.2.1.1. Aggregating Agent

Aggregating agents are not particularly limited and examples thereof include polyvalent metal salts, organic acids, and cationic resins.

Polyvalent metal salts are not particularly limited and examples thereof include polyvalent metal salts of inorganic acids and polyvalent metal salts of organic acids. The polyvalent metals are not particularly limited and examples thereof include alkaline earth metals from group 2 of the periodic table (for example, magnesium and calcium), transition metals from group 3 of the periodic table (for example, lanthanum), earth metals from group 13 of the periodic table (for example, aluminum), and lanthanides (for example, neodymium). As salts of these polyvalent metals, carboxylates (formate, acetate, benzoate, and the like), sulfates, nitrates, chlorides, and thiocyanates are suitable.

Among the above, examples include calcium salts or magnesium salts of carboxylic acids (formate, acetate, benzoate, and the like), calcium salts or magnesium salts of sulfuric acid, calcium salts or magnesium salts of nitric acid, calcium chloride, magnesium chloride, and calcium salts or magnesium salts of thiocyanate. These polyvalent metals salt may be used alone or in combination of two or thereof.

Organic acids are not particularly limited and examples thereof include acids having a carboxyl group, such as succinic acid, oxalic acid, malonic acid, citric acid, acetic acid, and the like.

Cationic resins are not particularly limited and examples thereof include amine-based resins such as amine-epichlorohydrin-condensation polymers, polyallylamine, poly(vinylpyridine) salts, polyalkylaminoethyl acrylate, polyalkylaminoethyl methacrylate, poly(vinylimidazole), poly(glucosamine), polyethyleneimine, polybiguanide, polyhexymethylene guanide, and polyguanide, cationic urethane resins, and the like.

The content of the aggregating agent is preferably 1.0% to 20% by mass with respect to the total amount of the processing liquid, more preferably 2.5% to 15% by mass, and even more preferably 5.0% to 10% by mass. When the content of the aggregating agent is in the ranges described above, the shading unevenness of the image formed by the white ink composition and the non-white ink composition is further suppressed and the color developing property is further improved. Furthermore, it is also possible to improve the recording speed and to improve the abrasion resistance of the obtained recorded material.

1.2.1.2. Water

The water content is preferably 50% to 80% by mass with respect to the total amount of the processing liquid, more preferably 55% to 75% by mass, and even more preferably 60% to 70% by mass.

1.1.1.3. Water-Soluble Organic Solvent

The water-soluble organic solvents are not particularly limited and examples thereof include glycerin; glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, and 1,6-hexanediol; glycol monoethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, and triethylene glycol monobutyl ether; nitrogen-containing solvents such as 2-pyrrolidone, N-methyl-2-pyrrolidone, and N-ethyl-2-pyrrolidone; and alcohols such as methanol, ethanol, n-propyl alcohol, iso-propyl alcohol, n-butanol, 2-butanol, tert-butanol, iso-butanol, n-pentanol, 2-pentanol, 3-pentanol, and tert-pentanol. These water-soluble organic solvents may be used alone or in combination of two or more thereof.

Among the above, glycol-based solvents such as 1,2-hexanediol and propylene glycol, and nitrogen-containing solvents such as 2-pyrrolidone are preferable. Using such water-soluble organic solvents tends to further improve the image quality and abrasion resistance of the obtained recorded material and to further improve the printing speed.

The content of the water-soluble organic solvent is preferably 10% to 40% by mass with respect to the total amount of the processing liquid, more preferably 15% to 35% by mass, and even more preferably 20% to 30% by mass. The content of the water-soluble organic solvent being in the ranges described above tends to further improve the image quality and abrasion resistance of the obtained recorded material and to further improve the printing speed.

1.2.1.4. Surfactant

The surfactants are not particularly limited and examples thereof include acetylene glycol-based surfactants, fluorine-based surfactants, and silicone-based surfactants. Among the above, a silicone-based surfactant is preferable. Due to this, there is a tendency to further improve the wettability of the processing liquid with respect to the recording medium.

Acetylene glycol-based surfactants are not particularly limited, but one or more selected from, for example, 2,4,7, 9-tetramethyl-5-decyne-4,7-diol and alkylene oxide adducts of 2,4,7,9-tetramethyl-5-decyne-4,7-diol, and 2,4-dimethyl-5-decyne-4-ol and alkylene oxide adducts of 2,4-dimethyl-5-decyne-4-ol are preferable.

Fluorine-based surfactants are not particularly limited and examples thereof include perfluoroalkyl sulfonates, perfluoroalkyl carboxylates, perfluoroalkyl phosphate esters, perfluoroalkyl ethylene oxide adducts, perfluoroalkyl betaines, and perfluoroalkyl amine oxide compounds.

Examples of silicone-based surfactants include polysiloxane-based compounds, polyether-modified organosiloxanes, and the like.

The surfactant content is preferably 0.1% to 4.0% by mass with respect to the total amount of the processing liquid, more preferably 0.3% to 3.0% by mass, and even more preferably 0.5% to 2.0% by mass. Due to this, there is a tendency to further improve the wettability of the processing liquid with respect to the recording medium.

In the recording region to which the white ink composition and the non-white ink composition are attached, the maximum attachment amount of the processing liquid is preferably 5 mg/inch$^2$ or less, more preferably 0.1 to 4 mg/inch$^2$, even more preferably 0.3 to 3 mg/inch$^2$, and yet more preferably 0.5 to 1 mg/inch$^2$. The attachment amount being in the ranges described above tends to further improve the color developing property and the like of the obtained recorded material.

1.3. White Ink Attaching Step

The white ink attaching step is a step for attaching a white ink composition including a white coloring material to a recording medium. The white ink attaching step may be performed by any method having a form in which the white ink composition is attached while scanning the recording head with respect to the recording medium.

For example, it is preferable to use an ink jet head as the recording head and to eject the white ink composition and the non-white ink composition from the ink jet head, in the white ink attaching step and the non-white ink attaching step. In this manner, it is possible to efficiently carry out various types of printing in small quantities with a small apparatus. In such a case, since the white ink composition and the non-white ink composition are attached by a relative scanning, the ink jet heads which eject the white ink composition and the non-white ink composition are the same.

In addition, in the recording region to which the white ink composition and the non-white ink composition are attached, the attachment amount of the white ink composition is preferably 100% by mass or less with respect to 100% by mass of the attachment amount of the non-white ink composition per unit region. The attachment amount of the white ink composition is preferably 10% to 100% by mass with respect to 100% by mass of the attachment amount of non-white ink composition, more preferably 20% to 90% by mass, even more preferably 30% to 90% by mass, and yet more preferably 40% to 80% by mass. Furthermore, 40% to 50% by mass is preferable. By setting the attachment amount of the white ink composition to 100% by mass or less, the ratio of non-white ink composition tends to increase and the color developing property of the obtained recorded material tends to be further improved. It is also possible to express the above percentages in terms of the attachment amount ratio. The attachment amount ratio is the attachment amount of the white ink composition/the attachment amount of the non-white ink composition. When 100% by mass of the white ink is set with respect to 100% by mass of the non-white ink described above, the attachment amount ratio is 1.

The unit region is a region having an area with which it is possible to confirm the attachment amount of ink. For example, the unit region is an area of 1×1 mm.

In the recording region to which the white ink composition and the non-white ink composition are attached, the maximum attachment amount of the white ink composition is preferably 15 mg/inch$^2$ or less, more preferably 1 to 12 mg/inch$^2$, even more preferably 3 to 10 mg/inch$^2$, and yet more preferably 5 to 9 mg/inch$^2$. Setting the maximum attachment amount of the white ink composition to 15 mg/inch$^2$ or less tends to further improve the color developing property of the obtained recorded material.

1.3.1. White Ink Composition

The white ink composition includes a white coloring material and may include water, a water-soluble organic solvent, a surfactant, resin particles, and waxes, as necessary.

When the white ink composition is mixed with a 5% by mass aqueous solution of calcium acetate monohydrate, the viscosity of the white ink composition after mixing is preferably 2 times or more, more preferably 2 to 5 times or more, and even more preferably 3 to 5 times the viscosity of the white ink composition before mixing. When a viscosity increase ratio is in the ranges described above, shading unevenness of the obtained recorded material is further suppressed and it is possible to form an image with excellent color developing property.

It is possible to adjust the viscosity increase ratio depending on the type, content, and the like of the components which react with the processing liquid, such as coloring materials and resins, in the components included in the ink.

It is possible to obtain the viscosity after mixing described above by mixing the white ink composition and a 5% by mass aqueous solution of calcium acetate monohydrate in a mass ratio of 10 g of the white ink composition with respect to 1 g of a 5% by mass aqueous solution of calcium acetate monohydrate, stirring for 10 seconds, and then quickly measuring the viscosity. The viscosity measurement before and after mixing and the mixing process described above are all performed at room temperature, 25° C. In addition, as the viscometer, an E-type viscometer is used and the shear rate is 200 s$^{-1}$.

1.3.1.1. White Coloring Material

The white coloring material is not particularly limited and examples thereof include white inorganic pigments such as C.I. Pigment White 6, 18, 21, silica, alumina, titanium dioxide, zinc oxide, antimony oxide, magnesium oxide, zirconium oxide, zinc sulfide, barium sulfate, and calcium carbonate. In addition to the white inorganic pigments, it is also possible to use white organic pigments such as white hollow resin particles and polymer particles.

As the white coloring material, among the above examples, it is preferable to use titanium dioxide from the viewpoint of favorable whiteness and abrasion resistance. Such white coloring material may be used alone or in combination of two or thereof.

The content of the white coloring material is preferably 0.5% to 20% by mass with respect to the total amount of the white ink composition, more preferably 1.0% to 20% by mass, even more preferably 3.0% to 20% by mass, and particularly preferably 5.0% to 20% by mass. The content of the white coloring material being in the ranges described above further suppresses shading unevenness of the image formed by the white ink composition and the non-white ink composition and tends to further improve the color developing property.

In the present embodiment, the white ink composition is used for the purpose of improving the visibility of the obtained image itself by being used together with the non-white ink composition, rather than for the purpose of concealing the background of the image. Therefore, it is possible to further reduce the content of the white coloring material in the white ink composition in comparison with a case where the purpose is to conceal the background. Due to this, sufficient visibility of the image is obtained and favorable dispersion stability of the white coloring material is facilitated, making settling less likely to occur. In addition, the filling in and reduction of image quality differences are also excellent, which is preferable.

The white coloring material is suitably able to disperse stably in the dispersing medium and such dispersion may be carried out using a dispersing agent. Examples of the dispersing agent include a resin dispersing agent or the like and the dispersing agent is selected from dispersing agents able to provide favorable dispersion stability of the white coloring material in the white ink composition including the white coloring material described above. In addition, the white coloring material may also be used as a self-dispersing pigment by modifying the surface of the pigment particles by oxidizing or sulfonating the pigment surface with, for example, ozone, hypochlorous acid, fuming sulfuric acid, or the like.

1.3.1.2. Water

The water content is preferably 50% to 75% by mass with respect to the total amount of the white ink composition, more preferably 50% to 70% by mass, and even more preferably 55% to 65% by mass.

1.3.1.3. Water-Soluble Organic Solvent

As water-soluble organic solvents, it is possible to exemplify the same examples as given for the processing liquid. Among these, glycol solvents such as 1,2-hexanediol and propylene glycol, and nitrogen-containing solvents such as 2-pyrrolidone are preferable. Using such water-soluble organic solvents tends to further improve the image quality and abrasion resistance of the obtained recorded material and tends to further improve the printing speed.

The content of the water-soluble organic solvent is preferably 10% to 40% by mass with respect to the total amount of the white ink composition, more preferably 15% to 35% by mass, and even more preferably 20% to 30% by mass. The content of the water-soluble organic solvent being in the ranges described above tends to further improve the image quality and abrasion resistance of the obtained recorded material and tends to further improve the printing speed.

Water-soluble organic solvents with a standard boiling point of 160° C. to 280° C. are preferable. The content of glycol-based solvents for which the standard boiling point exceeds 280° C. in the ink is preferably 2% by mass or less, more preferably 1% by mass or less, and even more preferably 0.5% by mass or less, and may be 0% by mass. The content of water-soluble organic solvents for which the standard boiling point exceeds 280° C. in the ink is also preferably in the ranges described above.

1.3.1.4. Surfactant

As surfactants, it is possible to exemplify the same examples as given for the processing liquid. Among the above, a silicone-based surfactant is preferable. Due to this, there is a tendency to further improve the wettability of the white ink composition with respect to the recording medium.

The content of the surfactant is preferably 0.1% to 4.0% by mass with respect to the total amount of the white ink composition, more preferably 0.3% to 3.0% by mass, and even more preferably 0.5% to 2.0% by mass. Due to this, there is a tendency to further improve the wettability of the white ink composition with respect to the recording medium.

1.3.1.5. Resin Particles

Using resin particles further improves the adhesiveness of the obtained image. The resin particles are not particularly limited and examples thereof include resin particles formed of urethane-based resins, acrylic-based resins (including styrene-acrylic-based resins), fluorene-based resins, polyolefin-based resins, rosin-modified resins, terpene-based resins, polyester-based resins, polyamide-based resins, epoxy-based resins, vinyl chloride-based resins, vinyl chloride-vinyl acetate copolymers, ethylene-vinyl acetate-based resins, and the like. The resin particles may be in the form of an emulsion.

Among the above, urethane-based resins, acrylic-based resins, and polyolefin-based resins are preferable. These resin particles are often handled in emulsion form, but may also be in powder form. In addition, these resin particles may be used alone or in combination of two or more thereof.

Urethane-based resin is a generic term for resins having urethane bonds. In addition to urethane bonds, for urethane-based resins, polyether-type urethane resins including ether bonds in the main chain, polyester-type urethane resins including ester bonds in the main chain, polycarbonate-type urethane resins including carbonate bonds in the main chain, and the like may be used.

Acrylic-based resin is a generic term for a polymer obtained by polymerizing at least an acrylic-based monomer such as (meth)acrylic acid or (meth)acrylic acid ester as one component and examples thereof include resins obtained from an acrylic-based monomer, copolymers of an acrylic-based monomer and other monomers, and the like. Examples thereof include acrylic-vinyl-based resins, which are copolymers of acrylic-based monomers and vinyl-based monomers. In addition, examples thereof include styrene as a vinyl-based monomer. It is also possible to use acrylamide, acrylonitrile, and the like as acrylic-based monomers.

Among the above, a styrene-acrylic-based resin is preferable. Styrene-acrylic-based resins are not particularly limited and examples thereof include styrene-acrylic acid copolymers, styrene-methacrylic acid copolymers, styrene-methacrylic acid-acrylic acid ester copolymers, styrene-α-methylstyrene-acrylic acid copolymers, styrene-a-methylstyrene-acrylic acid-acrylic acid ester copolymers, and the like. Using such resins tends to further improve the image quality and abrasion resistance of the obtained recorded material.

Polyolefin-based resins have olefins such as ethylene, propylene, and butylene as the structural backbone thereof and it is possible to appropriately select and use known polyolefin-based resins.

The content of the resin particles is preferably 0.5% to 15% by mass with respect to the total amount of the white ink composition, preferably 1.0% to 10% by mass, and more preferably 2.5% to 7.5% by mass. The content of the resin particles being in the ranges described above tends to further improve the abrasion resistance of the obtained recorded material.

1.3.1.6. Wax

Waxes provide a function of imparting smoothness to the image through the white ink composition, thus, it is possible to reduce peeling or the like of the image through the white ink.

Waxes are not particularly limited and examples thereof include plant and animal waxes such as carnauba wax, candelilla wax, beeswax, rice wax, and lanolin; petroleum waxes such as paraffin wax, microcrystalline wax, polyethylene wax, oxidized polyethylene wax, and petrolatum; mineral waxes such as montan wax and ozokerite; synthetic waxes such as carbon wax, Hoechst wax, polyolefin wax, and stearic acid amide wax; natural and synthetic wax emulsions such as α-olefin/maleic anhydride copolymers and blended waxes, and the like. These waxes may be used alone or in combination of two or more thereof. The waxes may be emulsions.

Among the above, it is preferable to use polyolefin waxes (in particular, polyethylene waxes and polypropylene waxes) and paraffin waxes. Using such waxes tends to further improve the abrasion resistance of the obtained recorded material.

The content of the wax is preferably 0.1% to 7.5% by mass with respect to the total amount of the white ink composition, more preferably 0.3% to 5.0% by mass, and even more preferably 0.5% to 2.5% by mass. The wax content being in the ranges described above tends to further improve the abrasion resistance of the obtained recorded material.

1.3.1.7. Other Components

White ink compositions may also contain components such as preservatives and fungicides, rust inhibitors, chelating agents, viscosity modifiers, antioxidants, and mold inhibitors, as necessary.

1.4. Non-White Ink Attaching Step

The non-white ink attaching step is a step of attaching a non-white ink composition including a non-white coloring material to a recording medium. The non-white ink attaching step may be performed by any method having a form in which the non-white ink composition is attached while scanning the recording head with respect to the recording medium. For example, the recording head may be an ink jet head and the non-white ink composition may be ejected from the ink jet head.

In addition, as described above, the white ink composition and the non-white ink composition may be ejected by the same ink jet head.

In the recording region to which the white ink composition and the non-white ink composition are attached, the maximum attachment amount of the non-white ink composition is preferably 20 mg/inch$^2$ or less, more preferably 1 to 20 mg/inch$^2$, even more preferably 3 to 15 mg/inch$^2$, and yet more preferably 5 to 12 mg/inch$^2$. The maximum attachment amount of the non-white ink composition being in the ranges described above tends to further improve the color developing property of the obtained recorded material.

1.4.1. Non-White Ink Composition

The non-white ink composition includes a non-white coloring material and may include water, water-soluble organic solvents, surfactants, resin particles, and waxes, as necessary. The components and composition of the non-white ink may be the same components and composition as for the white ink, with the important exception of the non-white coloring material and the like.

When the non-white ink composition is mixed with a 5% by mass aqueous solution of calcium acetate monohydrate, the viscosity of the non-white ink composition after mixing is preferably 2 times or more, more preferably 2 to 5 times or more, and even more preferably 3 to 5 times the viscosity of the non-white ink composition before mixing. The viscosity increase ratio being in the ranges described above further suppresses shading unevenness of the obtained recorded material and makes it possible to form images with excellent color developing property.

It is possible to obtain the viscosity after mixing described above by mixing the non-white ink composition and a 5% by mass aqueous solution of calcium acetate monohydrate in a mass ratio of 10 g of the non-white ink composition with respect to 1 g of a 5% by mass aqueous solution of calcium acetate monohydrate, stirring for 10 seconds, and then quickly measuring the viscosity. The viscosity measurement before and after mixing and the mixing process described above are all performed at room temperature, 25° C. In addition, as the viscometer, an E-type viscometer is used and the shear rate is 200 s$^{-1}$.

1.4.1.1. Non-White Coloring Material

Non-white coloring materials are not particularly limited as long as the coloring materials are not the white coloring materials described above and examples thereof include inorganic pigments such as carbon black (C.I. Pigment Black 7) such as furnace black, lamp black, acetylene black, and channel black; organic pigments such as quinacridone-based pigments, quinacridone quinone-based pigments, dioxazine-based pigments, phthalocyanine-based pigments, anthrapyrimidine-based pigments, ansanthrone-based pigments, indanthrone-based pigments, flavanthrone-based pigments, perylene-based pigments, diketopyrrolopyrrole-based pigments, perinone-based pigments, quinophthalone-based pigments, anthraquinone-based pigments, thioindigo-based pigments, benzimidazolone-based pigments, isoindolinone-based pigments, azomethine-based pigments, and azo-based pigments. Such non-white coloring material may be used alone or in combination of two or more thereof.

The content of the non-white coloring material is preferably 0.5% to 20% by mass with respect to the total amount of the non-white ink composition, more preferably 0.5% to 15% by mass, and even more preferably 0.5% to 10% by mass. The content of the non-white coloring material being in the ranges described above further suppresses shading unevenness of the image formed by the white ink composition and the non-white ink composition and tends to further improve the color developing property.

The non-white coloring material is suitably able to disperse stably in the dispersing medium and such dispersion may be carried out using a dispersing agent. Examples of dispersing agents include a resin dispersant or the like able to obtain favorable dispersion stability of the non-white coloring material in the non-white ink composition including the non-white coloring material described above are selected. In addition, the non-white coloring material may also be used as a self-dispersing pigment by modifying the surface of the pigment particles by oxidizing or sulfonating the pigment surface with, for example, ozone, hypochlorous acid, fuming sulfuric acid, or the like.

1.4.1.2. Water

The water content is preferably 50% to 75% by mass with respect to the total amount of the non-white ink composition, more preferably 50% to 70% by mass, and even more preferably 55% to 65% by mass.

1.4.1.3. Water-Soluble Organic Solvent

As water-soluble organic solvents, it is possible to exemplify the same examples as given for the processing liquid. Among these, glycol solvents such as 1,2-hexanediol and propylene glycol, and nitrogen-containing solvents such as 2-pyrrolidone are preferable. Using such water-soluble organic solvents tends to further improve the image quality and abrasion resistance of the obtained recorded material and to further improve the printing speed.

The content of the water-soluble organic solvent is preferably 10% to 40% by mass with respect to the total amount of the non-white ink composition, more preferably 15% to 35% by mass, and even more preferably 20% to 30% by mass. The content of the water-soluble organic solvent being in the ranges described above tends to further improve the image quality and abrasion resistance of the obtained recorded material and to further improve the printing speed.

1.4.1.4. Surfactant

As surfactants, it is possible to exemplify the same examples as given for the processing liquid. Among the above, a silicone-based surfactant is preferable. Due to this, there is a tendency to further improve the wettability of the non-white ink composition with respect to the recording medium.

The content of the surfactant is preferably 0.1% to 4.0% by mass with respect to the total amount of the non-white ink composition, more preferably 0.3% to 3.0% by mass, and even more preferably 0.5% to 2.0% by mass. Due to this, there is a tendency to further improve the wettability of the white ink composition with respect to the recording medium.

1.4.1.5. Resin Particles

As the resin particles, it is possible to exemplify the same examples as given for the white ink composition. Among the above, a styrene-acrylic-based resin is preferable. Using such a resin tends to further improve the image quality and abrasion resistance of the obtained recorded material.

The content of the resin particles is preferably 0.5% to 15% by mass with respect to the total amount of the non-white ink composition, preferably 1.0% to 10% by mass, and more preferably 2.5% to 7.5% by mass. The content of the resin particles being in the ranges described above tends to further improve the abrasion resistance of the obtained recorded material.

1.4.1.6. Wax

As waxes, it is possible to exemplify the same examples as given for the white ink composition. Among the above, a polyethylene wax is preferable. Using such waxes tends to further improve the abrasion resistance of the obtained recorded material.

The content of the wax is preferably 0.1% to 7.5% by mass with respect to the total amount of the non-white ink composition, more preferably 0.3% to 5.0% by mass, and even more preferably 0.5% to 2.5% by mass. The wax content being in the ranges described above tends to further improve the abrasion resistance of the obtained recorded material.

1.4.1.7. Other Components

Non-white ink compositions may also contain components such as preservatives and fungicides, rust inhibitors, chelating agents, viscosity modifiers, antioxidants, and mold inhibitors, as necessary.

1.5. Clear Ink Attaching Step

The recording method of the present embodiment may have a clear ink attaching step in which a clear ink composition is further attached. The clear ink is not for tinting the recording medium, but is an ink for improving the image quality, such as the abrasion resistance and gloss. The content of a coloring material in the clear ink is preferably 0.1% by mass or less, more preferably 0.01% by mass or less, and may be 0% by mass or less. In addition, the clear ink is also not a processing liquid as described above.

Here, it is possible for the composition of the clear ink composition to be the same as in the above non-white ink composition except with respect to the coloring material.

The clear ink attaching step may be performed by any method having a form in which the non-white ink composition is attached while scanning the recording head with respect to the recording medium. For example, the recording head may be an ink jet head and the clear ink composition may be ejected from the ink jet head.

The order in which the clear ink attaching step is performed is not particularly limited, but for example, it is preferable to attach the white ink composition and the non-white ink composition, and then further attach the clear ink composition.

In the recording region to which the white ink composition and the non-white ink composition are attached, the maximum attachment amount of the clear ink composition is preferably 5 mg/inch$^2$ or less, more preferably 0.1 to 4 mg/inch$^2$, even more preferably 0.5 to 4 mg/inch$^2$, and yet more preferably 1 to 4 mg/inch$^2$. The maximum attachment amount being in the ranges described above tends to improve the abrasion resistance and the like of the obtained recorded material.

1.6. Drying Step

The recording method of the present embodiment may have a drying step in which the recording medium is heated before each step, after the step of attaching a processing liquid, after the step of attaching a white ink and the step of attaching a non-white ink, and after the step of attaching a clear ink. The heating temperature is not particularly limited and is able to be set to, for example, 50° C. to 100° C.

The heating method is not particularly limited and examples thereof include a platen heater, a pre-heater, an IR heater, a blower fan, and the like.

1.7. Recording Medium

The recording medium used in the present embodiment is not particularly limited and examples thereof include absorbent recording media such as paper, film, and cloth, low-absorbent recording media such as printing paper, and non-absorbent recording media such as metal, glass, and polymers. Among the above, low-absorbent recording media or non-absorbent recording media are preferable in terms of ink absorption. In addition, non-white recording media are preferable in terms of color. In the related art, with such recording media, a white ink layer and a non-white ink layer are so as to overlap each other and the white ink layer is used as a concealing layer to record high-quality images. Therefore, using the present disclosure, it is possible to particularly effectively exhibit the effect of the present disclosure of forming an image with excellent color developing property without shading unevenness or the like.

In the present embodiment, a non-absorbent or low-absorbent recording medium refers to "a recording medium in which the amount of water absorbed from the start of contact to 30 msec$^{1/2}$ in the Bristow method is 10 mL/m$^2$ or less. The Bristow method is the most widespread method for measuring the amount of liquid absorbed in a short time and is also used by the Japan Technical Association of the Pulp and Paper Industry (JAPAN TAPPI). The details of the test method are described in Standard No. 51 "Paper and Paperboard—Liquid Absorption Test Method—Bristow Method" of "JAPAN TAPPI Paper and Pulp Test Methods 2000".

Examples of non-absorbent recording media include, for example, recording media in which plastic is coated on a base material such as paper, recording media in which a plastic film is bonded on a base material such as paper, a plastic film without an absorbent layer (receptive layer), and the like. Examples of the plastics referred to here include polyvinyl chloride, polyethylene terephthalate, polycarbonate, polystyrene, polyurethane, polyethylene, polypropylene, and the like.

Examples of low-absorbent recording media include recording media provided with a low-absorbent coating layer on the surface. For example, there is so-called coated paper. For example, when the base material is paper, examples include printing paper such as art paper, coated paper, and matte paper, and when the base material is a plastic film, examples include recording media in which polymers and the like are coated on a surface of polyvinyl chloride, polyethylene terephthalate, polycarbonate, polystyrene, polyurethane, polyethylene, polypropylene, or the like or in which particles such as silica or titanium are coated together with a binder.

It is also possible to use absorbent recording media as the recording medium. Absorbent recording media refers to "recording media in which the amount of water absorbed from the start of contact to 30 msec$^{1/2}$ in the Bristow method is greater than 10 mL/m$^2$" as described above.

As the absorbent recording media, the recording media is not particularly limited and examples thereof include plain paper, cardboard, liner paper, and the like. Examples of liner paper include paper formed of paper such as kraft pulp or recycled paper.

Examples of non-white recording media include a recording medium which is transparent (transparent recording medium). Transparent recording media may be colorless and transparent or tinted (colored) and transparent. In addition, transparent also includes translucent. These are recording media having visual light permeability. In addition, there are recording media with light permeability with respect to visible light. In such a case, it is possible to favorably view the image formed on one surface of the recording medium by the recording method of the present embodiment from both surface sides.

In addition, examples of the non-white recording medium include a recording medium with a non-white color (non-white colored recording medium). Examples thereof include non-white colored opaque recording media and non-white colored transparent recording media. Also in such a case, using the recording method of the present embodiment, it is possible to easily form images with favorable image quality, such as visibility, filling in, and reduction of image quality differences. The non-white-colored recording medium may be the transparent recording medium described above, or may be a non-transparent recording medium. A non-transparent recording medium is a recording medium which does not have visual light permeability. In addition, a non-transparent recording medium is also a recording medium with no light permeability with respect to visible light. Here, non-white colored is any color other than white.

2. Recording Apparatus

The recording apparatus of the present embodiment is a recording apparatus for performing recording on a recording medium, the apparatus including a processing liquid attaching mechanism for attaching a processing liquid including an aggregating agent to the recording medium, a white ink head for attaching a white ink composition including a white coloring material to the recording medium, a non-white ink head for attaching a non-white ink composition including a non-white coloring material to the recording medium, and a scanning mechanism for performing relative scanning between the white ink head and the non-white ink head and the recording medium, in which the recording is performed using the recording method described above.

A description will be given below of examples of recording apparatuses used in the present embodiment with reference to the drawings, but the recording apparatus used in the present embodiment is not limited to the following forms.

Figure 1:
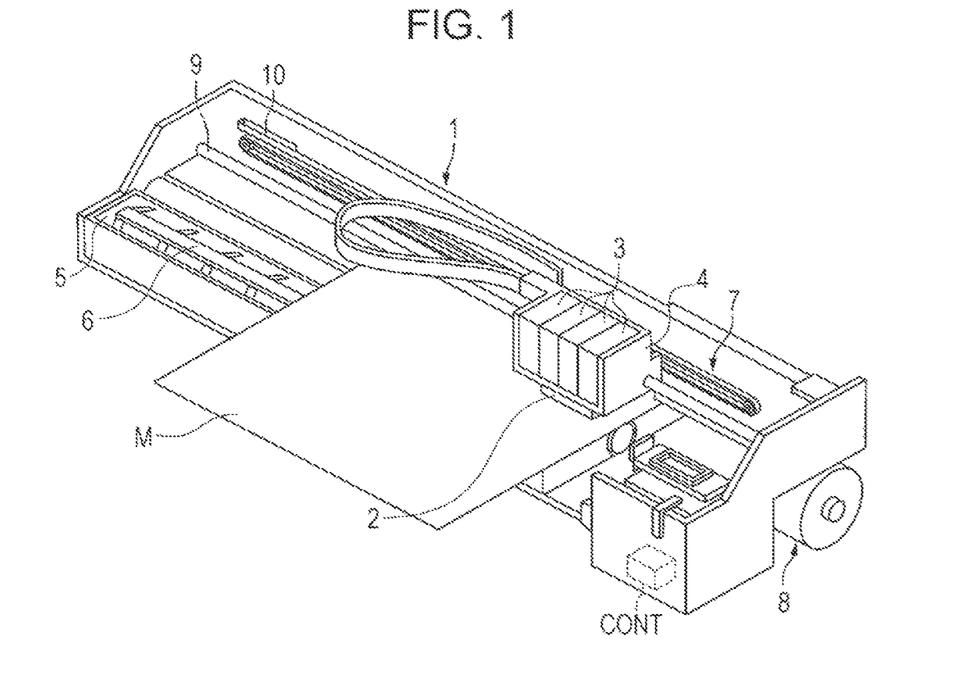
FIG. 1 shows an example of a recording apparatus used in a present embodiment.

FIG. 1 shows an example of a recording apparatus used in the present embodiment. In FIG. 1, an on-carriage type printer, in which ink cartridges are mounted on a carriage, is illustrated as an example, but the recording apparatus is not limited to an on-carriage type printer and may also be an off-carriage type printer, in which the ink cartridges are fixed externally.

The printer used in the following description is a serial printer in which an ink jet head for recording is mounted on a carriage which moves in a predetermined direction and the ink jet head moves along with the movement of the carriage to eject droplets on a recording medium. The recording apparatus is not limited to serial printers and may also be a line printer. A line printer is a printer of a type in which the ink jet head is formed to be wider than the width of the recording medium and the ink jet head ejects droplets on a recording medium without moving.

As shown in FIG. 1, the printer 1 is provided with a recording head 2, ink cartridges 3, a carriage 4, a platen 5, a heating mechanism 6, a carriage movement mechanism 7, a media feeding mechanism 8, a guide rod 9, a linear encoder 10, and a control section CONT.

The control section CONT controls the operation of the entire printer 1. The carriage 4 has the recording head 2, described below, mounted thereon and the ink cartridges 3 which supply each ink composition and processing liquid to the recording head 2 are also removably mounted thereon. The platen 5 is installed below the recording head 2 and a recording medium M, which is the recording medium, is transported thereon. The heating mechanism 6 heats the recording medium M. The carriage movement mechanism 7 moves the carriage 4 in the media width direction of the recording medium M. The media feeding mechanism 8 transports the recording medium M in the media feeding direction. Here, the media width direction is a main scanning direction MS, which is the operating direction of the recording head 2. The media feeding direction is the direction orthogonal to the main scanning direction MS and is a sub-scanning direction SS in which the recording medium M moves.

The recording head 2 is a means to attach each ink composition or processing liquid to the recording medium M and is provided with a first nozzle which ejects a white ink composition and a second nozzle which ejects a non-white ink composition on a surface opposing the recording medium M to which each ink composition is to be attached. The plurality of nozzles are arranged in a row such that a nozzle surface is formed on the nozzle plate surface. In FIG. 1, the recording head 2 functions as both a white ink head and a non-white ink head.

Examples of the method for ejecting the white ink composition or non-white ink composition from the nozzles include a piezoelectric method in which pressure is applied to the white ink composition or non-white ink composition by a piezoelectric element at the same time as a recording information signal to eject and record droplets of the white ink composition or non-white ink composition. In addition, as well as an ink jet head, a dot impact head, a thermal transfer head, or the like may be used as the recording head 2.

Figure 2:
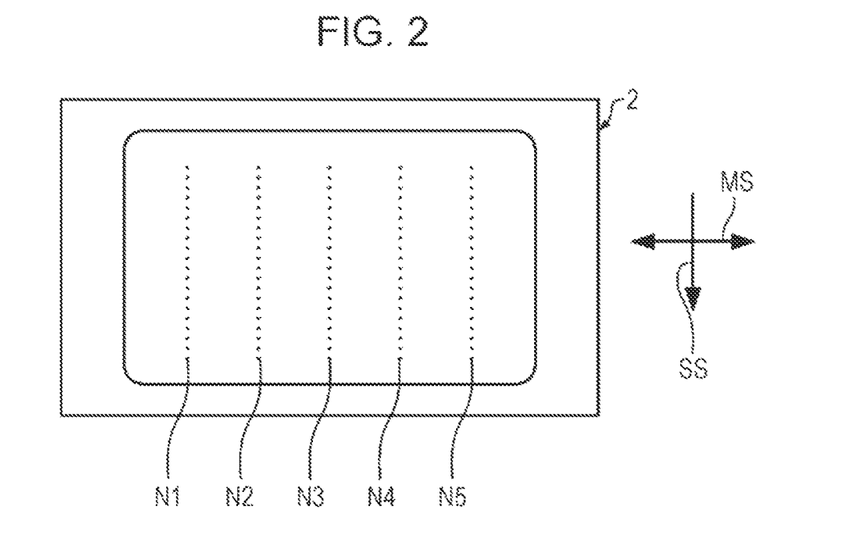
FIG. 2 shows an example of an ink jet head configuration.

FIG. 2 shows the nozzle formation surface when an ink jet head is used as the recording head 2. In a case where scanning is performed by ejecting a white ink composition from the nozzle row N1 and a non-white ink composition from a nozzle row N2, the nozzle row N1 and the nozzle row N2 have overlapping portions in the sub-scanning direction SS when projected in the main scanning direction MS. In such a case, the white ink composition and the non-white ink composition are attached to the same region of the recording medium by one scan of the ink jet head.

In the case of the above example, the same region is the portion where the nozzle row N1 and the nozzle row N2 overlap each other in the sub-scanning direction SS when the nozzle row N1 ejecting a white ink and the nozzle row N2 ejecting a non-white ink are projected in the main scanning direction MS.

Figure 3:
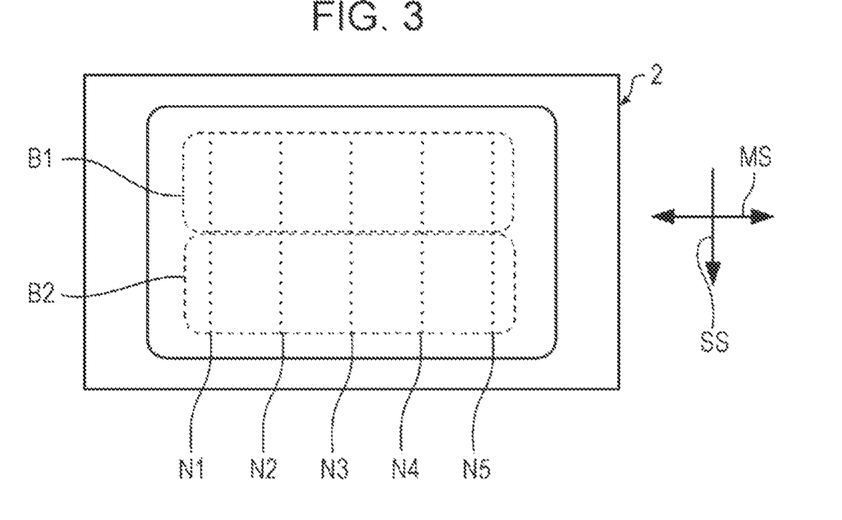
FIG. 3 shows an example of an ink jet head configuration.
Figure 4:
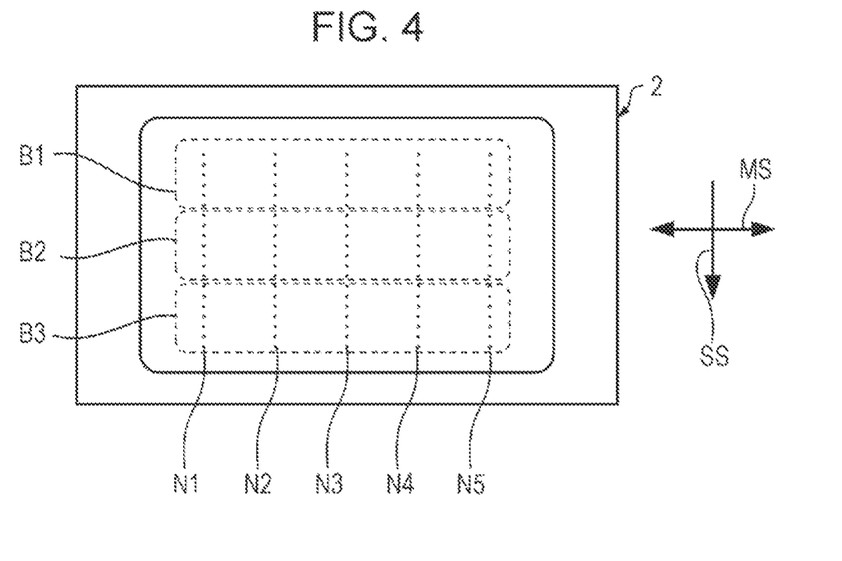
FIG. 4 shows an example of an ink jet head configuration.

In addition, FIGS. 3 and 4 show other forms of ink jet heads. In the ink jet heads illustrated in FIGS. 3 and 4, the region of blocks B1 to B3 is further divided in the sub-scanning direction SS. In these ink jet heads, it is possible to change the type of droplet to be ejected for each block and nozzle row. For example, in FIG. 3, the ink jet head may be configured such that a white ink is ejected in block B1 of the nozzle row N1, a non-white ink is ejected in blocks B1 and B2 of the nozzle row N2, and a processing liquid is ejected in blocks B1 to B3 of a nozzle row N3. In this manner, by further dividing the blocks in the sub-scanning direction SS of the ink jet head, it is possible to realize more flexible forms of ejection.

In FIG. 1, the ink cartridges 3 which supply the white ink composition or the like to the recording head 2 are formed of four independent cartridges. For example, three of the four cartridges are each filled with different types of ink compositions and one thereof is filled with a processing liquid. The ink cartridges 3 are removably mounted on the recording head 2. In the example of FIG. 1, the number of cartridges is four but the number is not limited thereto and it is possible to mount any desired number of cartridges.

The carriage 4 is attached in a state of being supported on the guide rod 9, which is a support member erected in the main scanning direction, and is moved along the guide rod 9 in the main scanning direction by the carriage movement mechanism 7. In the example of FIG. 1, the carriage 4 moves in the main scanning direction but is not limited thereto and may also move in the sub-scanning direction, in addition to moving in the main scanning direction.

As long as the heating mechanism 6 is provided in a position where it is possible to heat the recording medium M, the installation position is not particularly limited. In the example of FIG. 1, the heating mechanism 6 is installed on the platen 5 at a position opposite the recording head 2. When the heating mechanism 6 is installed at a position opposing the recording head 2, it is possible to reliably heat the attachment position of the white ink composition and non-white ink composition on the recording medium M and to efficiently dry the white ink composition and non-white ink composition attached to the recording medium M.

Examples of the heating mechanism 6 include a print heater mechanism which heats the recording medium M through contact with a heat source, a mechanism which irradiates infrared rays or microwaves, which are electromagnetic waves having a maximum wavelength of approximately 2450 MHz, or the like, a dryer mechanism which blows hot air, and the like.

The heating of the recording medium M by the heating mechanism 6 is performed before, or when, the droplets ejected from the nozzles of the recording head 2 are attached to the recording medium M. The control of various heating conditions, for example, the timing of the heating implementation, the heating temperature, the heating time, and the like, is performed by the control section CONT.

The linear encoder 10 detects the position of the carriage 4 in the main scanning direction by signals. The signals detected by the linear encoder 10 are sent to the control section CONT as position information. The control section CONT recognizes the scanning position of the recording head 2 based on the position information from the linear encoder 10 and controls the recording operation, that is, the ejection operation and the like, of the recording head 2. The control section CONT is configured to enable variable control of the movement speed of the carriage 4.

EXAMPLES

A more detailed description will be given below of the present disclosure using Examples and Comparative Examples. The present disclosure is not limited in any way by the following Examples.

1. Method for Preparing Ink Composition and Processing Liquid 1.1. Resin 1: Styrene-Acrylic Resin Emulsion A styrene-acrylic resin emulsion (resin 1) was obtained by copolymerizing styrene/acrylic acid/methyl methacrylate/cyclohexyl methacrylate in a mass ratio of 75/0.8/14.2/10 by emulsion polymerization. At this time, 2 parts by mass of Newcol NT-30 (manufactured by Nippon Nyukazai Co., Ltd.) were used as the surfactant for emulsion polymerization, with the total monomer amount being 100 parts by mass.

1.2. Resin 2: Styrene-Acrylic Resin Emulsion

A styrene-acrylic resin emulsion (resin 2) was obtained by the same method as resin 1, except that the amount of acrylic acid was increased with respect to the total monomer amount.

1.3. Preparation

Each material was mixed with the composition shown in Table 1 below and stirred sufficiently to obtain each ink composition and processing liquid. Specifically, the ink compositions and processing liquids were prepared by uniformly mixing each material and removing insoluble materials with a filter. In Table 1 below, the numerical values are in units of % by mass and the total is 100.0% by mass. In addition, unless otherwise noted, the solid content is shown.

TABLE 1

|  |  | Reaction liquid | | Ink | | | |
|---|---|---|---|---|---|---|---|
|  |  | | | White | | Non-white | Clear |
|  |  | Composition A1 | Composition A2 | Composition B1 | Composition B2 | Composition C | Composition D |
| Organic solvent | 1,2-hexanediol | 2.0 | 2.0 | 2.0 | 2.0 | 2.0 | 2.0 |
|  | 2-pyrrolidone | 15.0 | 15.0 | 15.0 | 15.0 | 15.0 | 15.0 |
|  | Propylene glycol | 9.0 | 9.0 | 9.0 | 9.0 | 9.0 | 9.0 |
| Surfactant | BYK348 | 2.0 | 2.0 | 1.0 | 1.0 | 1.0 | 1.0 |
| Resin | Resin 1 |  |  | 5.0 |  | 5.0 | 7.0 |
|  | Resin 2 |  |  |  | 5.0 |  |  |
| Wax | Hi-tech E6500 |  |  | 1.0 | 1.0 | 1.0 | 2.0 |
| Pigment | P.B.15:3 |  |  |  |  | 7.0 |  |
|  | Titanium dioxide |  |  | 10.0 | 10.0 |  |  |
| Aggregating agent | Calcium acetate monohydrate | 7.0 |  |  |  |  |  |
|  | Cation Master PD-7 |  | 7.0 |  |  |  |  |
| Water |  | Remains | Remains | Remains | Remains | Remains | Remains |
| Total |  | 100 | 100 | 100 | 100 | 100 | 100 |
| Viscosity increase ratio |  | — | — | 2 times | 4 times | 4 times | 1.5 times |

BYK348: Silicone-based surfactant manufactured by BYK Japan KK.
HITEC E6500: Polyethylene wax emulsion, manufactured by Toho Chemical Industry Co., Ltd.
Cation Master PD-7: Amine-epichlorohydrin condensation type polymer manufactured by Yokkaichi Chemical Co., Ltd.

1.4. Viscosity Increase Ratio

The viscosities of the white ink composition and non-white ink composition were measured using an E-type viscometer (manufactured by Anton Paar MCR302) at a shear rate of 200 s$^{-1}$ at room temperature. In addition, mixing was carried out in a mass ratio of 10 g of the white ink composition or the non-white ink composition with respect to 1 g of a 5% by mass aqueous solution of calcium acetate monohydrate, and stirring was carried out for 10 seconds. After that, the viscosity of the mixture was quickly measured using an E-type viscometer (manufactured by Anton Paar MCR302) at a shear rate of 200 s$^{-1}$ at room temperature. The viscosity increase ratio was calculated from the ratio of the obtained viscosity before mixing to the viscosity after mixing.

2. Evaluation 2.1. Shading Unevenness

Figure 5:
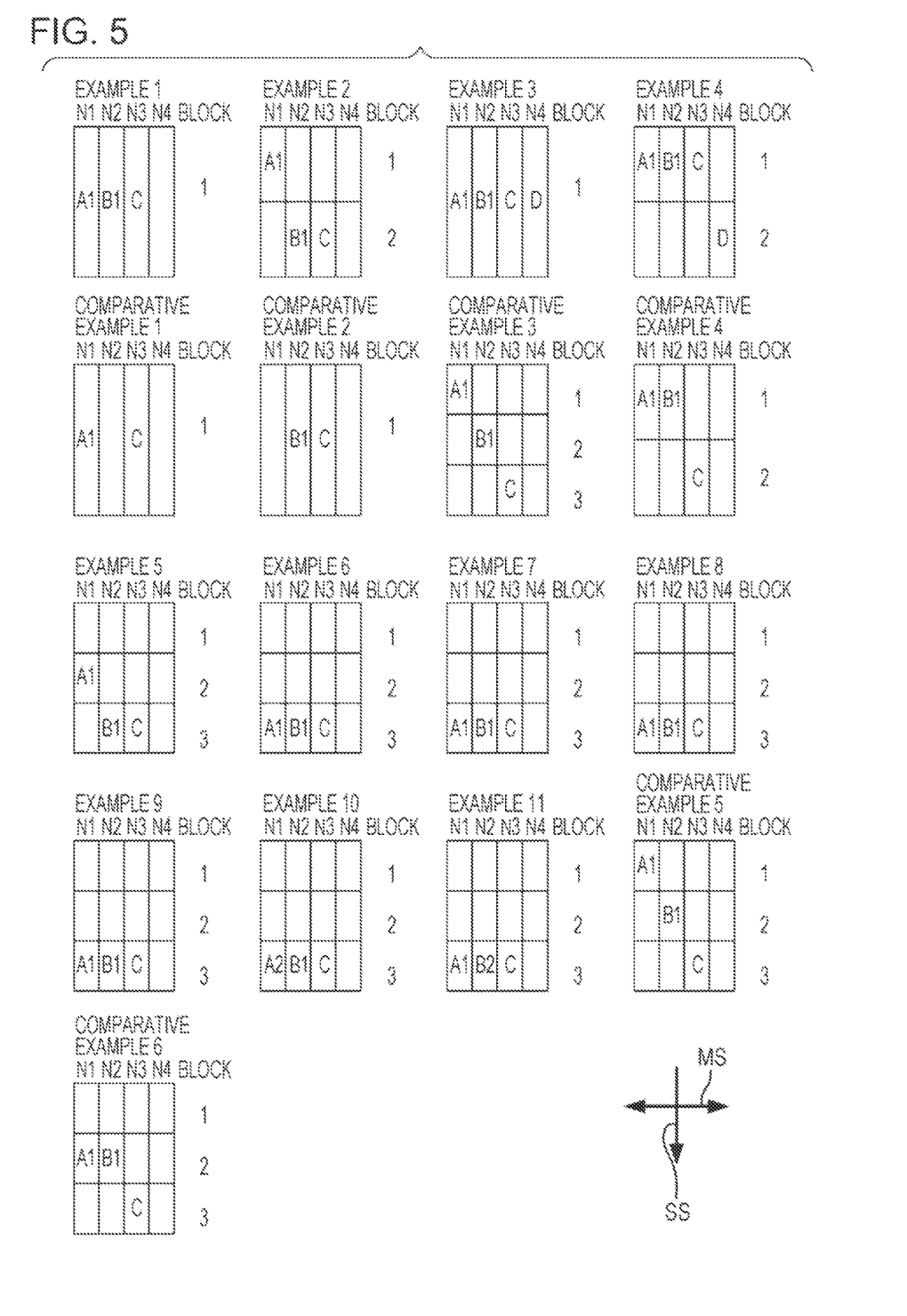
FIG. 5 shows examples of ink jet head configurations used in Examples and Comparative Examples.

A modified serial-type ink jet printer (product name: SC-S40650) was prepared. 360 nozzles per nozzle row imparted a nozzle density of 360 dpi. As shown in FIG. 5, ink jet heads are provided which are able to eject any of the droplets listed in Tables 2 and 3 in a region defined by the nozzle rows N1 to N4 and the block number.

The ink jet printer was filled with the ink composition and processing liquid described above, each ink composition and processing liquid was able to be ejected from the nozzle rows and blocks specified in Tables 2 and 3, and a solid image was recorded with the attachment amount and the number of passes described in Tables 2 and 3. The number of passes described in Tables 2 and 3 means the number of passes per ink for which the main scanning is performed on a band region of one sub-scan distance, for example, with four passes, the distance of one sub-scan with respect to the length of the nozzle row used in the recording is one quarter thereof.

In Tables 2 and 3, M1 means that a K liner (manufactured by Oji Paper Co., Ltd.) was used as the recording medium, while M2 means that a transparent PVC medium E1000ZC (manufactured by Lintec Corporation) was used as the recording medium. In the examples using the recording medium M1, primary and secondary heating were not performed. On the other hand, in the examples using the recording medium M2, primary heating was performed with a platen heater such that the surface temperature of the recording medium was 35° C. and secondary heating was performed with a secondary heater such that the surface temperature of the recording medium was 70° C.

The recorded material obtained as described above was confirmed visually and the shading unevenness in the solid pattern was evaluated according to the following evaluation criteria.

(Evaluation Criteria)

A: No shading unevenness is visible in the color in the pattern

B: Fine shading unevenness is slightly visible in the color in the pattern

C: Fine shading unevenness is quite visible in the color in the pattern

D: Large shading unevenness is visible in the color in the pattern 2.2. Color Developing Property The recorded material obtained as described above was confirmed visually and evaluated for color developing property according to the following evaluation criteria. The visual confirmation was performed from the recording surface side.

(Evaluation Criteria)

A: A beautiful cyan color is visible

B: A slightly whitish cyan color is visible

C: A clearly whitish cyan color

D: The color is whitish and does not appear to be a cyan color 2.3. Abrasion Resistance The solid pattern portion of the recorded material obtained as described above was subjected to a load using a school vibration type color fastness rubbing tester ("AB-301" manufactured by Tester Sangyo Co., Ltd.) and the image portion was rubbed with a friction device to which a white cotton cloth (in accordance with JIS L 0803) was attached. The image was then visually observed for peeling and the abrasion resistance was evaluated according to the following evaluation criteria. The recording medium M1 was rubbed 20 times with a weight of 100 g and the recording medium M2 was rubbed 50 times with a weight of 200 g.

(Evaluation Criteria)
AA: No visible abrasion
A: Some abrasion is visible when viewed closely
B: Clear abrasion is visible
C: Abrasion is severe 2.4. Recording Speed The recording speed was evaluated according to the number of printing passes. In the following evaluation criteria, the recording speed is evaluated based on the number of passes, but it is possible to determine the actual recording speed by comparing and considering a case where the attachment of the white ink composition and non-white ink composition with respect to a scanning region is performed by a relative scanning and a case where the attachment is performed by separate operations.

(Evaluation Criteria)
A: The number of printing passes is 4 or less
B: The number of printing passes is 5 or more and 8 or less
C: The number of printing passes is 9 or more

TABLE 2

|  | Example 1 | | | | Example 2 | | | |
| --- | --- | --- | --- | --- | --- | --- | --- | --- |
| Nozzle row | N1 | N2 | N3 | N4 | N1 | N2 | N3 | N4 |
| Ink or the like | Composition A1 | Composition B1 | Composition C | — | Composition A1 | Composition B1 | Composition C | — |
| Attachment amount (mg/inch²) | 1 | 10 | 10 | — | 1 | 10 | 10 | — |
| No. of head division | | 1 | | | | 2 | | |
| Used block No. | 1 | 1 | 1 | — | 1 | 2 | 2 | — |
| No. of printing passes | | 4 | | | | 8 | | |
| Attachment amount ratio (White/Non-white) | | 1 | | | | 1 | | |
| Recording medium | | M1 | | | | M1 | | |
| Shading unevenness | | A | | | | B | | |
| Color developing property | | A | | | | A | | |
| Abrasion resistance | | B | | | | B | | |
| Speed | | A | | | | B | | |

|  | Example 3 | | | | Example 4 | | | |
| --- | --- | --- | --- | --- | --- | --- | --- | --- |
| Nozzle row | N1 | N2 | N3 | N4 | N1 | N2 | N3 | N4 |
| Ink or the like | Composition A1 | Composition B1 | Composition C | Composition D | Composition A1 | Composition B1 | Composition C | Composition D |
| Attachment amount (mg/inch²) | 1 | 10 | 10 | 4 | 1 | 10 | 10 | 4 |
| No. of head division | | 1 | | | | 2 | | |
| Used block No. | 1 | 1 | 1 | 1 | 1 | 1 | 1 | 2 |
| No. of printing passes | | 4 | | | | 8 | | |
| Attachment amount ratio (White/Non-white) | | 1 | | | | 1 | | |
| Recording medium | | M1 | | | | M1 | | |
| Shading unevenness | | B | | | | A | | |
| Color developing property | | A | | | | A | | |
| Abrasion resistance | | A | | | | AA | | |
| Speed | | A | | | | B | | |

|  | Comparative example 1 | | | | Comparative example 2 | | | |
| --- | --- | --- | --- | --- | --- | --- | --- | --- |
| Nozzle row | N1 | N2 | N3 | N4 | N1 | N2 | N3 | N4 |
| Ink or the like | Composition A1 | — | Composition C | — | — | Composition B1 | Composition C | — |
| Attachment amount (mg/inch2) | 1 | — | 10 | — | — | 10 | 10 | — |
| No. of head division | | 1 | | | | 1 | | |
| Used block No. | 1 | — | 1 | — | — | 1 | 1 | — |
| No. of printing passes | | 4 | | | | 4 | | |
| Attachment amount ratio (White/Non-white) | | — | | | | 1 | | |
| Recording medium | | M1 | | | | M1 | | |
| Shading unevenness | | A | | | | D | | |
| Color developing property | | D | | | | C | | |
| Abrasion resistance | | B | | | | A | | |
| Speed | | A | | | | A | | |

TABLE 2-continued

|  | Comparative example 3 | | | | Comparative example 4 | | | |
| --- | --- | --- | --- | --- | --- | --- | --- | --- |
| Nozzle row | N1 | N2 | N3 | N4 | N1 | N2 | N3 | N4 |
| Ink or the like | Composition A1 | Composition B1 | Composition C | — | Composition A1 | Composition B1 | Composition C | — |
| Attachment amount (mg/inch2) | 1 | 10 | 10 | — | 1 | 10 | 10 | — |
| No. of head division | | 3 | | | | 2 | | |
| Used block No. | 1 | 2 | 3 | — | 1 | 1 | 2 | — |
| No. of printing passes | | 12 | | | | 8 | | |
| Attachment amount ratio (White/Non-white) | | 1 | | | | 1 | | |
| Recording medium | | M1 | | | | M1 | | |
| Shading unevenness | | C | | | | B | | |
| Color developing property | | D | | | | D | | |
| Abrasion resistance | | B | | | | B | | |
| Speed | | C | | | | B | | |

TABLE 3

|  | Example 5 | | | Example 6 | | |
| --- | --- | --- | --- | --- | --- | --- |
| Nozzle row | N1 | N2 | N3 | N1 | N2 | N3 |
| Ink or the like | Composition A1 | Composition B1 | Composition C | Composition A1 | Composition B1 | Composition C |
| Attachment amount (mg/inch$^2$) | 1 | 5 | 10 | 1 | 5 | 10 |
| No. of head division | | 3 | | | 3 | |
| Used block No. | 2 | 3 | 3 | 3 | 3 | 3 |
| No. of printing passes | | 8 | | | 4 | |
| Attachment amount ratio (White/Non-white) | | 0.5 | | | 0.5 | |
| Recording medium | | M2 | | | M2 | |
| Shading unevenness | | A | | | B | |
| Color developing property | | A | | | B | |
| Abrasion resistance | | A | | | B | |
| Speed | | B | | | A | |

|  | Example 7 | | | Example 8 | | |
| --- | --- | --- | --- | --- | --- | --- |
| Nozzle row | N1 | N2 | N3 | N1 | N2 | N3 |
| Ink or the like | Composition A1 | Composition B1 | Composition C | Composition A1 | Composition B1 | Composition C |
| Attachment amount (mg/inch$^2$) | 3 | 5 | 10 | 1 | 7 | 10 |
| No. of head division | | 3 | | | 3 | |
| Used block No. | 3 | 3 | 3 | 3 | 3 | 3 |
| No. of printing passes | | 4 | | | 4 | |
| Attachment amount ratio (White/Non-white) | | 0.5 | | | 0.7 | |
| Recording medium | | M2 | | | M2 | |
| Shading unevenness | | A | | | B | |
| Color developing property | | A | | | C | |
| Abrasion resistance | | C | | | C | |
| Speed | | A | | | A | |

|  | Example 9 | | | Example 10 | | |
| --- | --- | --- | --- | --- | --- | --- |
| Nozzle row | N1 | N2 | N3 | N1 | N2 | N3 |
| Ink or the like | Composition A1 | Composition B1 | Composition C | Composition A2 | Composition B1 | Composition C |
| Attachment amount (mg/inch$^2$) | 1 | 3 | 10 | 1 | 5 | 10 |
| No. of head division | | 3 | | | 3 | |
| Used block No. | 3 | 3 | 3 | 3 | 3 | 3 |
| No. of printing passes | | 4 | | | 4 | |
| Attachment amount ratio (White/Non-white) | | 0.3 | | | 0.5 | |
| Recording medium | | M2 | | | M2 | |
| Shading unevenness | | B | | | B | |
| Color developing property | | A | | | C | |
| Abrasion resistance | | A | | | A | |
| Speed | | A | | | A | |

TABLE 3-continued

|  | Example 11 | | | Comparative example 5 | | |
| --- | --- | --- | --- | --- | --- | --- |
| Nozzle row | N1 | N2 | N3 | N1 | N2 | N3 |
| Ink or the like | Composition A1 | Composition B2 | Composition C | Composition A1 | Composition B1 | Composition C |
| Attachment amount (mg/inch$^2$) | 1 | 5 | 10 | 1 | 5 | 10 |
| No. of head division |  | 3 |  |  | 3 |  |
| Used block No. | 3 | 3 | 3 | 1 | 2 | 3 |
| No. of printing passes |  | 4 |  |  | 12 |  |
| Attachment amount ratio (White/Non-white) |  | 0.5 |  |  | 0.5 |  |
| Recording medium |  | M2 |  |  | M2 |  |
| Shading unevenness |  | A |  |  | A |  |
| Color developing property |  | A |  |  | D |  |
| Abrasion resistance |  | C |  |  | A |  |
| Speed |  | A |  |  | C |  |

|  | Comparative example 6 | | |
| --- | --- | --- | --- |
| Nozzle row | N1 | N2 | N3 |
| Ink or the like | Composition A1 | Composition B1 | Composition C |
| Attachment amount (mg/inch$^2$) | 1 | 5 | 10 |
| No. of head division |  | 3 |  |
| Used block No. | 2 | 2 | 3 |
| No. of printing passes |  | 8 |  |
| Attachment amount ratio (White/Non-white) |  | 0.5 |  |
| Recording medium |  | M2 |  |
| Shading unevenness |  | B |  |
| Color developing property |  | D |  |
| Abrasion resistance |  | B |  |
| Speed |  | B |  |

3. Evaluation Results

As described above, performing the attachment of the white ink composition and the non-white ink composition with respect to a scanning region by a relative scanning using the recording method of the present disclosure makes it possible to obtain a recorded material having excellent color developing property and abrasion resistance in which shading unevenness is suppressed and also to improve the printing speed.

In particular, as the results, in Comparative Example 1, which did not use a white ink composition, the color developing property was poor, and, in Comparative Example 2, which did not use a processing liquid, the shading unevenness was poor. In addition, in Comparative Examples 3 and 4, where the white ink composition and the non-white ink composition were not attached simultaneously, it is understood that both color developing property and shading unevenness were inferior and, in addition, the recording speed was also inferior because the number of passes was increased due to not performing the attachment simultaneously.

What is claimed is:

1. A recording method for performing recording on a recording medium, the method comprising:
    a processing liquid attaching step of attaching a processing liquid including an aggregating agent to the recording medium;
    a white ink attaching step of attaching a white ink composition including a white coloring material to the recording medium; and
    a non-white ink attaching step of attaching a non-white ink composition including a non-white coloring material to the recording medium,
    wherein attachment of the white ink composition and attachment of the non-white ink composition are performed by relative scanning of a recording head and the recording medium, the recording head being mounted on a carriage and the relative scanning being conducted by moving the carriage in a main scanning direction and ejecting the white ink composition and the non-white ink composition from the recording head, the recording head including a nozzle row for ejecting the white ink composition and a nozzle row for ejecting the non-white ink composition, the nozzle row for ejecting the white ink composition and the nozzle row for ejecting the non-white ink composition having overlapping portions a direction orthogonal to the main scanning direction when protected in the main scanning direction; and
    attachment of the white ink composition and attachment of the non-white ink composition are performed on the same scanning region of the recording medium by the same relative scanning.

2. The recording method according to claim 1, wherein, in a recording region where the white ink composition and the non-white ink composition are attached, an attachment amount of the white ink composition is 100% by mass or less with respect to an attachment amount of 100% by mass of the non-white ink composition per unit region.

3. The recording method according to claim 1, wherein the recording head is an ink jet head.

4. The recording method according to claim 1, wherein each of the white ink composition and the non-white ink composition is attached to the scanning region by scanning two times or more.

5. The recording method according to claim 1, wherein, in a recording region where the white ink composition and the non-white ink composition are attached, a maximum attachment amount of the white ink composition is 15 mg/inch$^2$ or less.

6. The recording method according to claim 1, wherein, when the white ink composition is mixed with a 5% by mass aqueous solution of calcium acetate monohydrate, a viscosity of the white ink composition after mixing is 2 times or more a viscosity of the white ink composition before mixing, and when the non-white ink composition is mixed with a 5% by mass aqueous solution of calcium acetate monohydrate, a viscosity of the non-white ink composition after mixing is 2 times or more a viscosity of the non-white ink composition before mixing.

7. The recording method according to claim 1, wherein
a content of the white coloring material is 5% to 20% by mass with respect to a total amount of the white ink composition, and
a content of the non-white coloring material is 0.5% to 10% by mass with respect to a total amount of the non-white ink composition.

8. The recording method according to claim 1, wherein the white ink composition and the non-white ink composition are each a water-based ink.

9. The recording method according to claim 1, wherein the recording medium is a low-absorbent recording medium or a non-absorbent recording medium.

10. The recording method according to claim 1, wherein the recording medium is a non-white recording medium.

11. A recording apparatus for performing recording on a recording medium, the apparatus comprising:
a processing liquid attaching mechanism for attaching a processing liquid including an aggregating agent to the recording medium;
a white ink head for attaching a white ink composition including a white coloring material to the recording medium;
a non-white ink head for attaching a non-white ink composition including a non-white coloring material to the recording medium; and
a scanning mechanism for performing relative scanning between the white ink head and the recording medium and between the non-white ink head and the recording medium, wherein
recording is performed using the recording method according to claim 1.

12. The recording method according to claim 1, wherein a single ink layer including the white ink composition and the non-white ink composition is formed by the same relative scanning.

* * * * *